United States Patent Office 3,829,363
Patented Aug. 13, 1974

3,829,363
PROCESS FOR THE PRODUCTION OF HIGH QUALITY FUNGAL PROTEIN FROM STARCH AND STARCHY PROCESSING WASTES
Charles J. Rogers and W. Emile Coleman, Cincinnati, Ohio, assignors to the United States of America as represented by the Administrator of the Environmental Protection Agency
No Drawing. Filed June 29, 1972, Ser. No. 267,414
Int. Cl. C12b 1/00
U.S. Cl. 195—32
8 Claims

ABSTRACT OF THE DISCLOSURE

Fungal protein suitable as an additive for animal feeds, and as a human food supplement, is produced from starchy substrate materials, particularly potatoes and potato wastes, by homogenizing the starchy material and then subjecting it in a suitable mineral salt containing culture medium to the action of a strain of *Aspergillus niger*, and recovering the protein from the mold mycelia.

BACKGROUND OF THE INVENTION

The disposal of solid wastes, whether from industrial or other sources, presents a problem of increasing severity. Most current waste disposal practices do not even attempt to recover any of the potential values of solid wastes. This is true of industrial wastes from food processing industries. The traditional disposal methods of landfill, incineration, or dumping into flowing streams have not only been unsatisfactory from a value recovery standpoint, but are becoming less feasible as more stringent regulations concerning air and water pollution are put into effect.

The prevalence of poverty and the pressure of population growth in various parts of the world, especially the less developed areas, has made difficult the provision of a diet of adequate nutritive value, particularly with respect to protein content. Both calorie and protein deficiencies in the diets of large populations, with accompanying adverse effects on growth and maintenance of health, are widespread. Cereal grains furnish one of the best overall sources of calories, and some of these provide proteins as well. Animal protein has the most desirable quality of this nutrient. The quality of cereal protein is not as good as that from animals, primarily because the amino acid pattern is deficient in one or more amino acids, principally lysine.

In evaluating potential dietary sources of protein, whether for human or animal feeding purposes, the essential amino acids for a desirable amino acid pattern include lysine, methionine, phenylalanine, threonine, valine, tryptophan, and leucine, although arginine and histidine are also desirable in animal feeds. Hence, human and animal food supplements in the form of recovered protein materials containing these amino acids or of synthetic mixtures of these amino acids have often been proposed, and are being increasingly adopted.

A potential source of protein nutrients is provided by starch-containing substrates and waste residues from the processing of agricultural crops, which presently constitute a substantial disposal problem. Thus, the in-plant processing of potatoes, often resulting in weight losses of 17% to 30%, generates millions of tons of wastes annually. Thus, it was reported in 1968 that in the United States, the annual potato production was approximately 15 million tons. The in-plant processing of potatoes is estimated to generate from 2.6 to 5.3 million tons of potato waste annually. This waste contributes to water and land pollution. The problem to which the present invention is addressed is that of converting this starchy waste to a protein source which can serve as a supplement in human and animal nutrition, and for industrial coating and adhesive materials, and the like.

GENERAL DESCRIPTION OF THE INVENTION

In accordance with the present invention there is provided a novel process for the production of fungal protein by the growth of a certain strain of the mold genus *Aspergillus niger* on a starchy waste substrate. The term starchy waste substrate as employed herein includes potato processing by-products, as well as milk whey, citrus and other fruit wastes. The process of the invention will be illustrated with reference to the treatment of potato processing by-products, such as starch and peelings, but it is to be understood that this is solely for purposes of illustration and not to be regarded as limiting.

Many species of *Aspergillus* have been described. The species are separated into groups on the basis of the color of the mature spore masses. *Aspergillus niger* exhibits black or dark brown spores. The mold itself possesses active fermentative ability with regard to sugar substrates.

In accordance with the present invention it was found that a strain of *Aspergillus niger* having the numerical designation NRRL 5474 is capable of being grown on a starchy substrate whereby the starchy materials are metabolized with resulting extensive growth of the mold mycelia. Inasmuch as there is little (2%) protein in the substrate itself, the high content of protein in the mycelia, which is of the order of about 37% by weight, represents a transformation of the feed nitrogen, plus whatever nitrogen is available from the nutrients added to promote and support the fermentation, to achieve a protein biosynthesis.

The production of fungal proteins from carbohydrate sources by mold fermentation is known, and process of this type is described in Gray, U.S. Pat. 3,151,038, which discloses fermentation of an assimilable carbohydrate material, including potatoes, with organisms of the class *Fungi imperfecti*, in the presence of inorganic and/or nonprotein nitrogen sources, and extraction of the protein formed from the mold mycelium. However, the utilization rate is slow, requiring 2 to 4 days. The *Fungi imperfecti* belong to a different botanical classification (related to ascomycetes), from the Aspergillus family, which are phycomycetes.

In accordance with the present invention, the problem of slow utilization of starchy substrates which had characterized prior art processes, has been found to be overcome by employing as the micro-organism strain NRRL 5474 of *Aspergillus niger*, and by preconditioning the starchy material, such as potato starch and wastes by homogenizing the material to increase its surface area and sterilizing the material to induce gelatinization or swelling.

The combination of homogenization and sterilization has been found to cause a notable improvement in the utilization or fermentration rate, when employing *Aspergillus niger* strain NRRL 5474 as the organism. Thus, for example, potato starch in concentrations up to 8%, and potatoes in concentrations up to 10% are completely utilized within only 20 to 48 hours, as contrasted with the customary times of 3 to 6 days required for similar substrates with other organisms in prior art methods. The culture of this organism can utilize milk whey, citrus and other fruit wastes at rates equal to or superior to potato starch wastes to produce the same high quality protein.

Accordingly the present invention concerns a process for the production of fungal protein from an assimilable starchy material comprising the steps of:

(a) inoculating a sterilized culture medium containing an inorganic nitrogen source and an assimilable homogenized starchy substrate with strain NRRL 5474 of the genus *Aspergillus niger*;

(b) aerobically culturing said inoculated medium to accomplish growth of said fungus at a temperature between about 25° C. to about 50° C. and formation of protein; and (c) separating the resulting protein-containing fungal material from the culture, and recovering the protein therefrom.

As indicated above, the preferred source of assimilable starchy material is potatoes, potato wastes, and the like. These materials are supplied at rather high concentrations of from about 6% to about 10% by weight per 100 ml. of culture medium. Prior to their introduction into the culture medium, the potato materials are homogenized by any suitable method, as, for example, passage through a Waring blender, thereby increasing the available surface for access to the organism.

The homogenized starchy material is then added in the wet state to an aqueous culture medium containing the necessary amounts of various mineral nutrients to support the growth of the mold, such as ammonium salts, phosphates, calcium, and magnesium. In addition the culture medium contains a sufficient amount of an inorganic source of nitrogen, such as ammonium sulfate or other water soluble ammonium salt.

When the culture medium has been properly constituted, it is subjected to sterilization by heating for one hour or more at temperatures of about 110°–130° C., preferably 120° C., and for a sufficient time to achieve a degree of gelatinization of the starch manifested by swelling. The culture medium temperature is then reduced to the desired fermentation temperature, about 25° to 50° C., preferably about 37° C. The pH of the culture medium is maintained at about 2.0 to 5.0, which favors growth of *Aspergillus niger*, while at the same ti mesuppressing the growth of undesirable micro-organisms, which may be present.

At the end of the fermentation period, which ranges from 20 to 48 hours, preferably from 24 to 36 hours, the temperature is elevated to about 110°–130° C., preferably 120° C. for sufficient time, about 1 hour, to sterilize the product. The culture medium is filtered to recover the mold mycelia containing the fungal protein, the content of which is from about 35 to 40 percent, generally about 37% by weight. The protein is extracted from the mycelia by any conventional method, such as, for example, treatment with an aqueous solution of perchloric acid.

The assay of protein content of the fungal mycelia is based upon a summation of amino acids as indicated by the formula:

$$\text{Percent protein} = \frac{\text{Weight of amino acid}}{\text{Weight of sample}} \times 100$$

This represents the true protein content.

The average amino acid analysis of fungal protein produced by *Aspergillus niger* from potato waste, as compared with the amino acid analysis of several standard protein materials such as casein, soy bean meal, and corn, is shown in Table 1:

TABLE I.—AMINO ACID ANALYSIS OF A FUNGAL STRAIN COMPARED TO SEVERAL STANDARD PROTEINS

[Grams/16 grams nitrogen]

| Amino acid | Aspergillus niger on potato waste | Casein | Soy bean meal | Opaque-2 corn |
|---|---|---|---|---|
| Lysine | 4.2 | 8.0 | 6.6 | 4.2 |
| Histidine | 1.8 | 3.0 | 2.5 | 3.5 |
| Arginine | 4.7 | 4.0 | 7.0 | 6.8 |
| Aspartic acid | 9.4 | 7.0 | 8.3 | 10.0 |
| Threonine | 4.8 | 4.7 | 3.9 | 3.3 |
| Serine | 4.7 | 6.7 | 5.6 | 4.3 |
| Glutamic acid | 10.5 | 25.0 | 18.5 | 18.7 |
| Proline | 4.4 | 11.0 | 5.0 | 8.6 |
| Glycine | 5.0 | 2.5 | 3.8 | 4.8 |
| Alanine | 4.3 | 3.0 | 4.5 | 6.5 |
| Cystine | 0.8 | 1.0 | 1.2 | 1.7 |
| Methionine | 3.2 | 3.5 | 1.1 | 1.4 |
| Valine | 6.50 | 7.7 | 5.2 | 4.9 |
| Isoleucine | 5.3 | 6.5 | 5.8 | 3.2 |
| Leucine | 8.6 | 9.7 | 7.6 | 8.4 |
| Tyrosine | 4.4 | 6.5 | 3.2 | 3.9 |
| Phenylalanine | 7.7 | 5.9 | 4.8 | 4.4 |
| Tryptophan | 1.2 | 1.2 | 1.2 | 1.3 |

The nutritional value of a protein depends upon the complement of essential amino acids present. It will be apparent from Table I that the fungal protein obtained in accordance with the present invention compares favorably or even exceeds the ideal amino acids pattern of the Food and Agricultural Organization (FAO) of the United Nations, which is shown in Table II.

TABLE II.—UN FOOD AND AGRICULTURAL ORGANIZATION IDEAL AMINO ACID PATTERN

[Grams/16 grams nitrogen]

| | | | |
|---|---|---|---|
| Lysine | 4.2 | Alanine | |
| Histidine | | Cystine | 2.0 |
| Arginine | | Methionine | 2.2 |
| Aspartic acid | | Valine | 4.2 |
| Threonine | 2.8 | Isoleucine | 4.2 |
| Serine | | Leucine | 4.8 |
| Glutamic acid | | Tyrosine | 2.8 |
| Proline | | Phenylalanine | 2.8 |
| Glycine | | Tryptophan | 1.4 |

DESCRIPTION OF THE PREFERRED EMBODIMENTS

The following example illustrates the practice of the invention, but is not to be regarded as limiting:

Example 1

20 liters of nutrient culture medium containing mineral salts in the following proportions in grams per liter are prepared: $KH_2PO_4$ 1 gm.; $(NH_4)_2SO_4$ 1 gm.; $CaCl_2$ 0.2 gm.; and $MgCl_2$ 0.2 gm. The medium is placed in a Brunswick fermenter. 2000 grams of whole potatoes are homogenized in a Waring Blender for 5 minutes and 1600 grams is added as wet weight to the mineral salts medium. The medium is then sterilized for one hour at 120° C., cooled to a temperature of 37° C., and inoculated with a strain of *Aspergillus niger* (NRRL 5474), previously grown with 24 hours on 0.1 gram of homogenized potatoes. The temperature is maintained at 37° C., employing an aeration rate of 1 liter per minute, and with agitation of 100 r.p.m. during fermentation.

At the end of the fermentation period of 28 hours, the temperature is elevated to 120° C. for one hour to sterilize the product. The mycelia containing the fungal protein are recovered by filtration through a Buchner funnel. The product is dried to constant weight at 75° C. for 24 hours, after which an assay sample of 20 mg. is hydrolyzed and the amino acid composition is determined using an automatic amino acid analyzed (Biolyzer, Phoenix Instrument Co.), in accordance with the principles set forth in Spackman et al., Anal. Chem., 30, 1190–1206 (1958). Analysis of the fungal product revealed a protein content of 37% and an amino acid profile similar to that given in Table I above. The product is useful as an additive in animal feed, as a protein supplement in human foods, and as an ingredient of coatings, adhesives, and plastics.

What is claimed is:

1. Process for the production of fungal protein from a starchy substrate material assimilable by a strain of a fungus of the genus *Aspergillus niger* having the numerical designation NRRL 5474, comprising the steps of:

(a) homogenizing said starchy substrate material to increase its surface area and sterilizing said starchy substrate material to induce gelatinization or swelling;

(b) inoculating a sterilized culture medium containing an inorganic nitrogen source and an assimilable homogenized and sterilized starchy substrate material with a strain of a fungus of the genus *Aspergillus niger* having the numerical designation NRRL 5474;

(c) aerobically culturing said inoculated medium to accomplish growth of said fungus at a temperature between about 25° and about 50° C., with formation of protein-containing fungal material; and (d) separating said protein-containing fungal material from the culture, and recovering the protein therefrom.

2. The process of Claim 1 in which the starchy material is potatoes.

3. The process of Claim 1 in which the starchy material is potato waste.

4. The process of Claim 1 in which the pH of the culture medium is between about 2 and about 5.

5. The process of Claim 1 in which the period of culturing is between about 20 and about 48 hours.

6. The process of Claim 1 in which said culture medium, prior to inoculation, is additionally sterilized by heating at about 110° to about 130° C. to induce swelling of the starchy material.

7. The process of Claim 1 in which the substrate is milk whey.

8. The process of Claim 1 in which the substrate is citrus fruit waste.

References Cited

UNITED STATES PATENTS

| | | | |
|---|---|---|---|
| 3,708,396 | 1/1973 | Mitsuhashi et al. | 195—31 R |
| 3,709,783 | 1/1973 | Tanka et al. | 99—14 |

FOREIGN PATENTS

| | | | |
|---|---|---|---|
| 1,046,770 | 10/1966 | Great Britain | 99—14 |

OTHER REFERENCES

Abstract #59 "Fungal Biosynthesis of Protein from Potatoe Waste," presented at ACS Meeting 1970.

Greene et al., Industrial and Engineering Chemistry, December 1934, pp. 1297–1299.

Pelznar et al., Microbiology, 1972, pp. 820–822 McGraw Hill.

Fawns, Food Manufacture, June 1943, pp. 194–200.

A. LOUIS MONACELL, Primary Examiner

T. G. WISEMAN, Assistant Examiner

U.S. Cl. X.R.

195—35, 81; 426—807